Patented Mar. 21, 1944

2,344,916

UNITED STATES PATENT OFFICE 2,344,916

METHOD OF PREPARING CHEWING GUM BASES

Carl E. Hartwig, Teaneck, N. J., and Boris N. Lougovoy, Jackson Heights, N. Y., assignors to American Chicle Company, Long Island City, N. Y., a corporation of New Jersey No Drawing. Original application April 20, 1940, Serial No. 330,698. Divided and this application December 16, 1940, Serial No. 370,376

4 Claims. (Cl. 260—821)

This application is a division of our application filed April 20, 1940, Serial No. 330,698, the said application relating to a chewing gum base comprising latex coagulum obtained from the group of plants comprising *Asclepias syriaca, Asclepias sullivanti, Asclepias tuberosa, Asclepias subulata* and *Asclepias erosa*. The present application relates to a method of preparing a coagulum suitable as a chewing gum base from latex of the said plants and particularly *Asclepias syriaca*.

The milkweed, *Asclepias syriaca*, a dicotyledon, may be propagated by seed, in which case a typical annual is produced, or by vegetative growth of the root. The latter method appears more efficient and produces a hardier plant. The plants develop locally early in May and reach maturity approximately in mid-June; at this time, blossoms begin to form, full bloom is attained between the middle of June and July, depending, naturally, upon the weather conditions. The plants vary in size from one (1) foot to five and one-half (5½) feet in height, with respective increase in diameter of the stem and the leaf size. These are naturally dependent upon the vitality of the plant, its habitat, and the climatic conditions. The lactiferous system of the milkweed plant is composed of individual cells, and structurally resembles that of the Urticaceae and Apocynaceae rubber producing trees found in Borneo and Jamaica. It appears that in the milkweed, the latex is produced as a pathological action, dependent upon the existence of complete cell structure; for upon crushing a freshly picked (uprooted) plant, only a green nectar is obtained. The latex is only obtained when the stem is scarified or the leaves or leaf nodes injured. It has been observed that milkweed plants possess remarkable recuperative powers. Plants cut down to a height of four (4) inches from the ground, grow new stalks from within 10 to 21 days. If the cut is properly made at the interstices of the leaf nodes and stem, two new stalks develop, both of which soon give a copious yield of latex.

The above description of the common milkweed plant has been given in detail because this species may be considered as the best known representative of the family of Asclepias, and reference to it will be used in the following discussions and examples. However, it should be expressly understood that we do not wish to limit ourselves to this particular species, but that our invention covers other species of the same botanical family.

A heretofore proposed method of obtaining a rubbery compound from milkweed consisted of fermenting the plant when in the green state, removing the juice from the woody fibres, and boiling out the water. Under these conditions, the resulting product, which is probably a mixture of guttas, resins, and water soluble substances, is a gummy, bitter, sticky substance which is entirely unsuitable as a base for chewing gum. The gummy mass so obtained contains sugars, chlorophylls, enzymes and glucosides. All of these materials, according to our findings, interfere either with the chewing characteristics of the product or with the taste characteristics, such as bitterness produced by glucosides. Under another process (U. S. Patent No. 1,740,079, issued to T. A. Edison), the milkweed plant is dried, worked in a ball mill machine with water, and the separated rubbery mass is collected as a float on top of the water in a storage tank. The material so separated under this process is a sticky gutta which has no properties which are usually associated with any of the natural gums suitable for use in chewing gum base, nor could it be used as a gutta constituent of such bases in combination with waxes and resins.

We have found that an entirely different product can be obtained if a milkweed latex is collected from uncut plants, by cutting the stem or leaves. When such latex is diluted with water to about 50 percent and the resulting emulsion is warmed to about 80-90 degrees C., a coagulation takes place with the formation of a white, soft gummy material. This material has at first a bitter taste and is somewhat soft and sticky, but when well washed with water it produces a pure white gum having no taste and only a very faint ester-like odor, when warmed. This gum, after the excess water is removed so that the moisture content of the material is about 50 per cent, has a smooth, full, velvety, somewhat tough (as compared with chicle) chew, although it is possible to coagulate the latex by simple dilution with a large amount of water, or by direct heating of the latex to about 90 degrees C. This process helps the formation of the proper physical structure of the resulting gum, and also helps the subsequent removal of impurities by washing. The crude milkweed gum thus obtained may be milled or masticated and treated in the same manner as the crude gums, commonly used in chewing gum, are masticated in order to reduce the original elasticity and the original toughness. The crude milkweed gum may be blended with modifying agents, such as resins, to adjust its properties to the desired point. We have found that milkweed gum, after being masticated or milled sufficiently to reduce its viscosity to the point close to that of the gum chicle, may be used in chewing gum base in as large a proportion as 90 percent of the total weight of base, producing a product quite similar in properties to the one which could only be obtained by the use of a substantial amount of gum chicle in the base. In this case, the remaining components would be non-gummy ingredients, such as natural or synthetic resins, waxes or high fatty acids.

Although the method of producing a coagulum from the milkweed plant just described is the simplest and the best way of preparing the crude product, there are other methods which may be used. We found, for instance, that the whole milkweed plant may be cut and then squeezed through a vegetable juice squeezer or through a similar machine. This operation results in the extraction of a green watery solution, the amount of which is about 75 percent of the weight of the plant. The crude juice so obtained may then be treated with acid or it may be heated in order to effect a coagulation of a soft, dark green gummy solid. The resulting gum contains chlorophyll and soluble matters and has to be further purified before it can be used satisfactorily in a chewing gum base. It is also possible to dry the cut plant and to extract the dried product with a suitable solvent. Here again, the resulting product is a dark colored sticky mass which has to be further purified, since it is not suitable in this stage as a constituent of a chewing gum base. Because of the presence of chlorophyll, the purification of the crude product referred to in the last two cases is rather a tedious and lengthy procedure. According to our experience, the presence of water soluble materials, as well as chlorophyll, renders the milkweed gum coagulum unsuitable for use in chewing gum base, because these impurities produce stickiness and distort the physical structure of the gummy product essential for a good chewing gum base. Furthermore, we have found that it is not sufficient merely to extract guttas and resins present in milkweed gum in order to obtain a good material for a chewing gum base. This is evident from the fact that if the guttas and resins are extracted separately and then recombined, the resulting product is much inferior from the standpoint of a chewing gum base. In order to obtain a satisfactory product, the blend of the milkweed gum components should be made in such a way that the essential components—gutta and resins—are coagulated together from their suspension in a liquid. This operation may be accomplished by emulsifying the extracted materials in an alkaline medium and then acidifying the resulting product.

*Collection of the milkweed latex and its properties*

As an example, the latex was collected in suction flasks. An Erlenmeyer flask was fitted with a two-holed rubber stopper. Two glass tubes were inserted; one an L tube, the other rounded at the end and sharply constricted. To the L tube, an aspirator bulb was attached so that upon deflating the bulb, air is drawn through the flask to reinflate the aspirator bulb. The plant was cut at the first and topmost interstices of the leaf nodes and stem; the cut was made horizontally to the ground, but not completely through the stem. Enough outer stem coating was left intact to permit the cut portions to be suspended in inverted position parallel to the uncut portion of the plant. In this way, a cuplike surface was exposed from which the latex could easily be collected. This procedure was followed with each set of alternate leaf nodes to approximately 4″ to 5″ from the ground.

Each plant of the average height of 2½ to 3 feet yields from 6 to 8 cc. of latex. The latex is pure milk white with a clean ester-like odor, a little heavier than water and possesses a pH value of 4.8 to 5.2.

Approximately the same results were obtained when the same method was applied to *Asclepias sullivanti* and *Asclepias tuberosa*, other varieties of milkweed.

*Preparation of gum, using latex collected from Asclepias syriaca, Asclepias sullivanti, and Asclepias tuberosa*

A proportion of 2700 grams (about 6 pounds) of the milkweed latex was diluted with 2500 cc. of water, and then gradually heated to about 80 degrees C., with constant stirring. When the temperature reached about 60 degrees C., a coagulum began to form first on the bottom of the container; as the temperature rose, the coagulum became more abundant and began to form a sort of ball around the stirrer. The treatment was continued until the gum formed a solid mass in a clear solution. The coagulated gum was then removed and the excess water was squeezed out. The product had a good chew in general, but was slightly sticky and had a pronounced bitter taste. The coagulum was then repeatedly washed in hot water with mastication until the bitter taste disappeared. The addition of a small amount of caustic (to form about 0.5 percent solution with water) helped to speed up the washing. The alkali, of course, was then neutralized and the gum washed free from the solvent. This purification resulted in not only the elimination of the bitter taste, but it also eliminated stickiness and the resulting gum had remarkably good properties as a material to serve as a chewing gum base, resembling in many respects the gum chicle, particularly with respect to fullness of the chew. After the washing treatment, the gum was pressed to expel the excess water. About 1000 grams of wet gum were so obtained. This wet gum when completely dried yielded about 240 grams of dry gum.

Having described our invention, what we claim and desire to secure by Letters Patent is as follows:

1. A method of preparing a chewing gum base from milkweed latex comprising the steps of forming an aqueous emulsion of the latex, raising the temperature of the emulsion to about 60° C. and continuing heat treatment until coagulation takes place, and controlling the moisture content of the coagulum so that the water content is brought to about 50%.

2. A method of preparing a chewing gum base from milkweed latex comprising the steps of diluting the latex with water in volume not exceeding 50% of the latex, raising the temperature of the emulsion to about 60° C. and continuing heat treatment until coagulation takes place, as a step in the method, controlling the moisture content of the coagulant so that it is brought up to about 50% and removing the coagulum.

3. A method of preparing a chewing gum base from milkweed latex comprising the steps of forming an aqueous emulsion of the latex, heating the latex to about 80–90° C., as a step in the method, controlling the moisture content of the coagulant so that it is brought up to about 50% and removing the coagulum.

4. A method of preparing a chewing gum base from milkweed latex comprising the steps of forming an aqueous emulsion of the latex, gradually heating the latex during agitation thereof until the temperature of the latex reaches about 60° C., as a step in the method, controlling the moisture content of the coagulant so that it is brought up to about 50% and removing the coagulum.

CARL E. HARTWIG.
BORIS N. LOUGOVOY.